Jan. 15, 1963 W. MESSERSCHMITT 3,073,552
MEANS FOR MOUNTING A POWER UNIT OR UNITS ON
THIN WINGS OR CONTROL SURFACES OF AIRCRAFT
Filed Sept. 30, 1960

INVENTOR
Willy Messerschmitt

BY  Moore & Hall

ATTORNEYS

United States Patent Office 3,073,552
Patented Jan. 15, 1963

3,073,552
MEANS FOR MOUNTING A POWER UNIT OR UNITS ON THIN WINGS OR CONTROL SURFACES OF AIRCRAFT
Willy Messerschmitt, Munich, Germany, assignor to Messerschmitt Ag., Augsburg, Germany, a company of Germany
Filed Sept. 30, 1960, Ser. No. 59,744
Claims priority, application Germany Sept. 30, 1959
8 Claims. (Cl. 244—54)

This invention relates to means for mounting a power unit or units on thin wings or control surfaces of aircraft.

The direction of thrust generated by power units in vertical take-off and landing aircraft can be changed from the horizontal for normal flight into the vertical for take-off and landing by rotating and/or swivelling power units mounted on the tips of the wings.

Furthermore, the wings of high-speed aircraft, such as supersonic aircraft, must be very thin for reducing drag. However, for reasons of flexural strength a shaft attached to a swivelling or rotatable power unit, held in bearings inside the wing, cannot be arbitrarily reduced in diameter. The thickness of this shaft and of its bearings therefore determines the minimum thickness of the wing.

The main object of the present invention is to mount power units externally on thin wings or control surfaces of aircraft in such a way that the wing at these points need not be undesirably thick.

The invention solves this problem by utilising a major portion of the wing or of the chord of the wing in the immediate vicinity of the power unit for taking up those flexural stresses, which are due, more particularly, to the presence of the power unit, substantially in such manner that the loads transmitted to the wing by the power unit will be distributed over a relatively major wing area.

Preferably, this is effected in practice by providing the element containing or forming the pivot bearings of the power unit with a flexing member which is incorporated or connected with the wing, such as the skin of the wing on the upper or undersurface thereof. The flexing member may be constructed of a bendable material such as that used in the wing itself, e.g. a wrought aluminum alloy of the type designated "duralumin" or it may comprise other materials such as 17–7 or 17–5 stainless steel. It is preferred to give the flexing member according to the invention a flat rectangle shape. Alternatively, the flexing member may be embodied in a flat hollow body of approximately rectangular shape in plan.

The invention is exemplified by way of example on the accompanying drawings, wherein.

Figure 1:
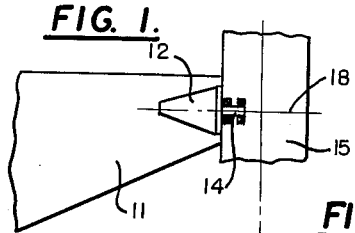
FIGURE 1 is a plan view of a mounting structure constructed in accordance with the present invention.
Figure 1A:
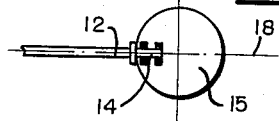
FIGURE 1A is an end-on view of the structure shown in FIGURE 1.
Figure 2:
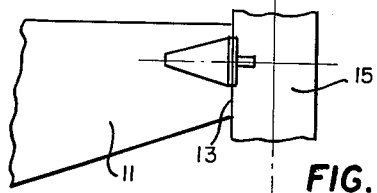
FIGURES 2 and 2A are respectively plan and end-on views of a modified mounting structure constructed in accordance with the present invention.
Figure 2A:
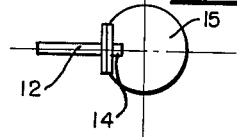
Figure 3:
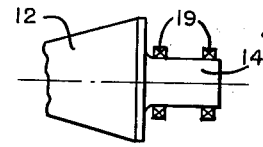
Figure 3A:
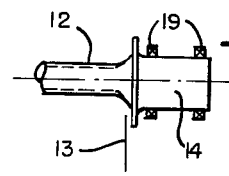
Figures 4, 4A:
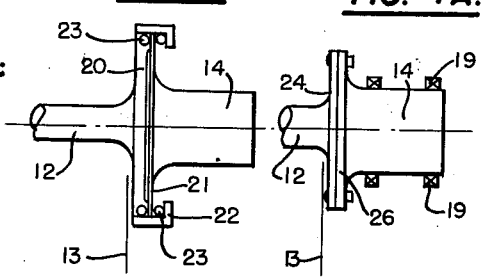
Figure 5:
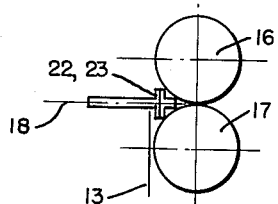
Figure 6:
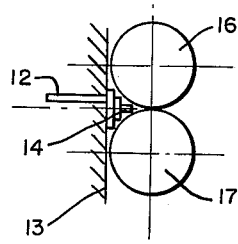

FIGURES 3 and 3A comprise more detailed plan and end-on views of the structure shown in FIGURES 1 and 1A;

FIGURES 4 and 4A are more detailed views of alternative mounting structures which may be employed in the embodiment of FIGURES 2 and 2A;

FIGURE 5 illustrates a modification of the structure shown in FIGURE 4, for mounting a pair of grouped power units; and FIGURE 6 illustrates still another modification of the present invention for supporting a pair of grouped power units.

FIG. 1 shows a plan view and FIG. 1A an end-on view, seen from the front, of a wing 11 of thin section. The flexing member 12, which may be rectangular and hollow, may be secured between the skins on the top and underface of the wing, as by riveting, for example.

The flexing member 12 projecting from the wing tip 13 carries a bearing or a pivot pin 14 about which a power unit 15, or a group of power units such as two units 16, 17 (see FIGS. 5 and 6) is pivotally deflectable, i.e. rotatable about axis 18. If only one power unit 15 is provided the pivot pin 14 may enter roughly in the radial direction, whereas when a pair of power units 16, 17, is provided, the pivot pin 14 may project into the frame, casing or the like, wherein the two power units 16, 17, are combined, to permit the entire combined unit 16, 17 to be tilted.

FIG. 2 shows an alternate embodiment of a wing with a tiltable power unit 15 mounted thereon, whereas FIG. 2A shows the flexing member 12 connected to pivot pin 14 and power unit 15, omitting the wing.

FIGS. 3 and 3A show the flexing member 12 from above and from the front, the pivot pin 14 being connected thereto. The pin carries bearing members, such as ball bearings or the like 19, which in turn carry the power unit.

Another embodiment of the invention is illustrated in FIGS. 4 and 4A.

In FIG. 4 a plate 20 is secured to the flexing member 12 or may be integral therewith. The pivot pin 14 is likewise formed with a plate 21, an annular embracing member 22 being secured to plate 20 in such manner that bearing elements, such as ball bearings 23, can be interposed between the two members 20 and 22.

As shown in FIG. 4A, a plate 24 affixed to or integral with the flexing member 12 may be connected with the pivot pin 14 by bolting it at 25 to an annular flange 26 on the pivot pin. In such an arrangement the pivot pin 14 must be associated with some form of bearing 19 which in the form of construction according to FIG. 4 will generally not be required.

In FIG. 5 the plate 22 or 23 may be arranged to project into the space between the two power units 16, 17 combined in a group.

As shown in FIG. 6, the bearing, i.e. the pivot pin 14, may be eccentric, that is to say offset in one or several directions in relation to the flexing member 12.

I claim:

1. A mounting for a power unit on an aircraft having thin wings comprising a flexible member attached to the skin of the wing of the aircraft adjacent the wing tip, said flexible member being adapted to transfer stresses imposed thereon directly to said wing skin for distribution over a significant portion of said wing skin, and a pivot pin attached to said flexible member and projecting therefrom beyond the wing tip for supporting a power unit, whereby structural stresses effected by said power unit are transmitted via said pivot pin to said flexible member and thence to the skin of said wing.

2. A mounting for a power unit on a thin winged aircraft comprising a flexing member mounted on and connected to the external skin of the wing of the aircraft adjacent the wing tip, said flexing member having a section in plan diminishing in width in a direction toward the aircraft fuselage, and a pivot pin extending from said flexing member beyond the wing tip for supporting a power unit, the interconnection between said flexing member and said wing skin being operative to transmit stresses, imposed on said pivot pin by said power unit, via said flexing member to said wing skin.

3. A structure for rotatably mounting a power unit on a thin winged aircraft comprising a flat hollow flexing member externally mounted on and attached to the skin of the wing of an aircraft adjacent the wing tip for transferring stresses to said skin, and a pivot pin projecting from said flexing member beyond the wing tip for rotatably supporting a power unit, whereby said power unit is ultimately supported for rotation by the skin of said wing.

4. A mounting for a power unit on a thin winged aircraft comprising a flexible member mounted on the wing of an aircraft and attached to the skin of said wing adjacent the wing tip for transferring stresses imposed thereon to the skin of said wing for distribution over and absorption by said skin, a pivot pin, means for attaching said pivot pin to said flexible member at such position that said pivot pin projects beyond the wing tip for supporting a power unit, whereby said power unit is supported by said wing skin via the agency of said pivot pin and flexing member, said attaching means including an annular plate carried by said flexing member, a flange on said pivot pin, and means for securing said plate and flange together.

5. A mounting for a power unit on a thin winged aircraft comprising a flexible member having a significant surface area overlying and attached directly to the skin of the wing of said aircraft for transmitting forces to said wing skin for distribution over the skin, a pivot pin carried by said flexible member and projecting beyond the wing tip for supporting a power unit, and rotary bearings on said pivot pin whereby said power unit may be rotated, the stresses effected by rotation of said power unit thereby being imposed upon the skin of said aircraft.

6. A mounting for a power unit on a thin winged aircraft comprising a flexible member externally mounted on and intimately attached directly to the skin of the wing of an aircraft for transmitting stresses to said skin of said wing, a supporting plate projecting from said flexing member, a pivot pin for supporting a power unit, means for attaching said pivot pin to said plate, and a rotary bearing between the plate and pivot pin whereby a power unit may be supported for rotation on the skin of said wing.

7. A mounting for a power unit on a thin winged aircraft comprising a flexible member externally mounted on the wing of an aircraft and firmly attached to the wing skin for transmitting stresses to the skin of said aircraft wing, and a pin carried by said flexible member in offset relation thereto, said pin projecting beyond the wing tip for supporting a power unit, the stresses of said unit being transferred via said pin and flexible member to said skin.

8. A mounting adapted to support a plurality of power units for rotation adjacent the wing tip of a thin winged aircraft, comprising a flexing member externally mounted on the wing skin of said aircraft adjacent said wing tip for transmitting stresses to said wing via the skin of said wing, a plate projecting from said flexing member, a pin having a flange thereon, means for securing said flange and plate together, an dmeans for supporting a plurality of power units for rotation on said pin.

References Cited in the file of this patent

UNITED STATES PATENTS

| | | |
|---|---|---|
| 2,377,006 | Heinemann et al. | May 29, 1945 |
| 2,665,862 | Grill | Jan. 12, 1954 |
| 2,848,181 | Landers | Aug. 19, 1958 |
| 2,926,869 | Sullivan | Mar. 1, 1960 |

FOREIGN PATENTS

| | | |
|---|---|---|
| 1,067,311 | Germany | Oct. 15, 1959 |